United States Patent
Gritsch

(10) Patent No.: US 11,381,073 B2
(45) Date of Patent: Jul. 5, 2022

(54) HIGHLY REDUNDANT DC VOLTAGE NETWORK

(71) Applicant: SIEMENS AKTIENGESELLSCHAFT, Munich (DE)

(72) Inventor: Christian Gritsch, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 59 days.

(21) Appl. No.: 16/615,050

(22) PCT Filed: May 23, 2018

(86) PCT No.: PCT/EP2018/063448
§ 371 (c)(1),
(2) Date: Nov. 19, 2019

(87) PCT Pub. No.: WO2018/215511
PCT Pub. Date: Nov. 29, 2018

(65) Prior Publication Data
US 2020/0212669 A1    Jul. 2, 2020

(30) Foreign Application Priority Data

May 24, 2017 (EP) .................................. 17172817

(51) Int. Cl.
*H02H 7/26*   (2006.01)
*H02J 1/10*   (2006.01)
(Continued)

(52) U.S. Cl.
CPC ............ *H02H 7/268* (2013.01); *H02J 1/102* (2013.01); *H02J 7/34* (2013.01); *H02J 1/16* (2013.01); *H02J 2310/42* (2020.01)

(58) Field of Classification Search
None
See application file for complete search history.

(56) References Cited

U.S. PATENT DOCUMENTS

2002/0014802 A1   2/2002  Cratty et al.
2004/0102109 A1   5/2004  Cratty et al.
(Continued)

FOREIGN PATENT DOCUMENTS

| RU | 2479914 C2 | 4/2013 |
| RU | 163553 U1 | 7/2016 |
| WO | WO 2005-049418 A2 | 6/2005 |

OTHER PUBLICATIONS

PCT International Search Report and Written Opinion of International Searching Authority dated Jul. 13, 2018 corresponding to PCT International Application No. PCT/EP2018/063448 filed May 23, 2018.

*Primary Examiner* — Jeffrey A Gblende
(74) *Attorney, Agent, or Firm* — Henry M. Feiereisen LLC

(57) ABSTRACT

A DC voltage network includes at least three energy storage networks, each having an energy store supplying a DC voltage, and at least three power converters implemented as DC voltage converters. The energy store and the power converters are electrically connected at a common point, At least three DC voltage sub-networks are each connected to a respective power converter of the energy storage networks. A feed device connects a respective DC voltage sub-network to an AC voltage network. The DC voltage network may be installed in a vehicle, in particular a ship. In a method of controlling the DC voltage network in the event of a fault, at least one of the power converters is switched off to protect the DC voltage network, depending on the location of the fault.

9 Claims, 1 Drawing Sheet

(51) Int. Cl.
*H02J 7/34* (2006.01)
*H02J 1/16* (2006.01)

(56) References Cited

U.S. PATENT DOCUMENTS

| | | |
|---|---|---|
| 2008/0304296 A1 | 12/2008 | NadimpalliRaju et al. |
| 2009/0284200 A1* | 11/2009 | Iwahori .................. H02M 7/48 |
| | | 318/400.27 |
| 2010/0013317 A1* | 1/2010 | Ballantine ............... H02J 1/102 |
| | | 307/82 |
| 2011/0089873 A1 | 4/2011 | Blocher et al. |
| 2015/0200609 A1* | 7/2015 | Hytten ..................... H05B 3/02 |
| | | 219/488 |
| 2016/0156191 A1* | 6/2016 | Takanaka ................ H02J 3/383 |
| | | 307/82 |
| 2018/0076734 A1* | 3/2018 | Jimichi ................... H02M 1/32 |

* cited by examiner

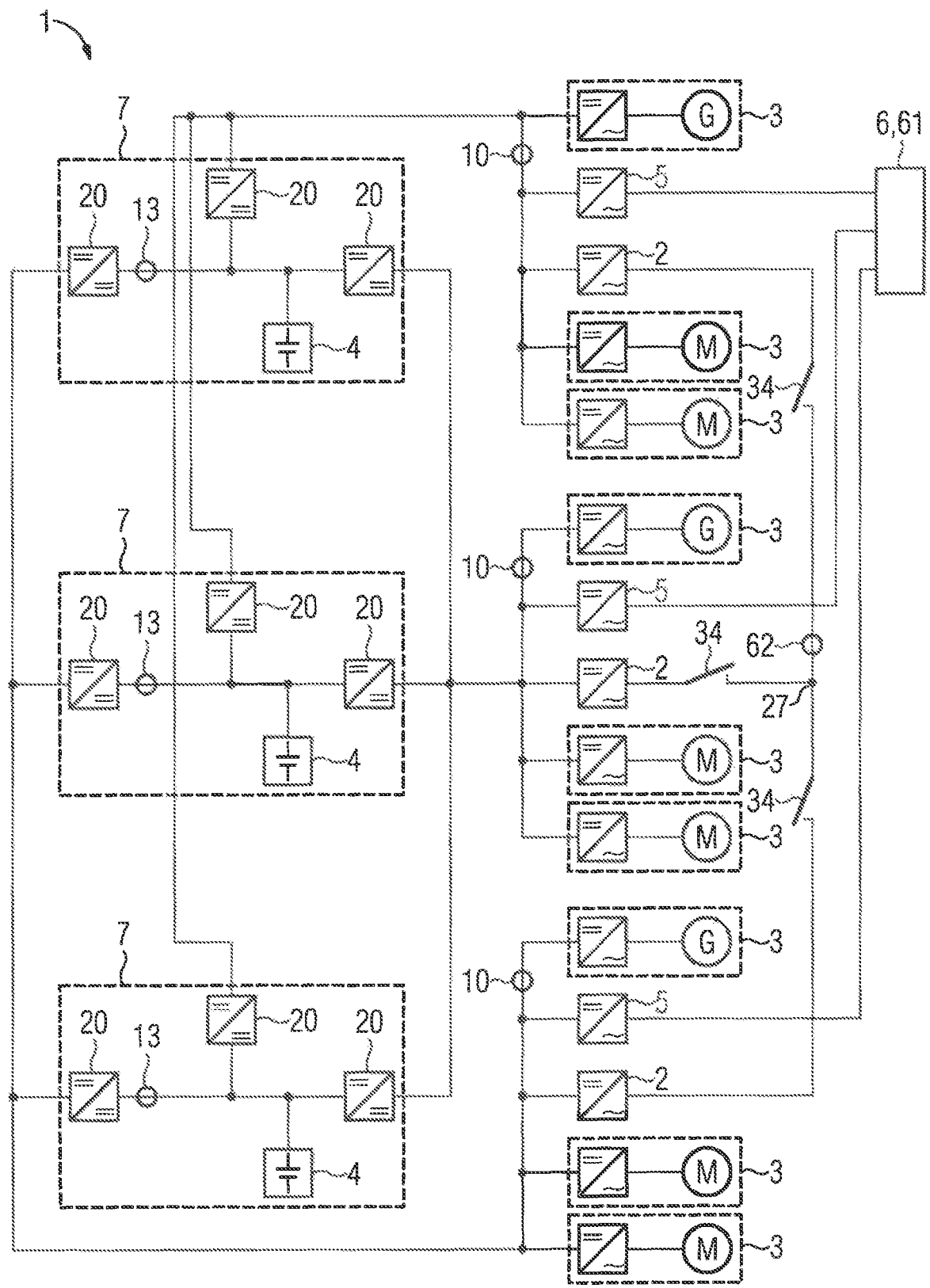

HIGHLY REDUNDANT DC VOLTAGE NETWORK

CROSS-REFERENCES TO RELATED APPLICATIONS

This application is the U.S. National Stage of International Application No. PCT/EP2018/063448 filed May 23, 2018, which designated the United States and has been published as International Publication No. WO 2018/215511 A1 and which claims the priority of European Patent Application, Serial No. 17172817.3, filed May 24, 2017, pursuant to 35 U.S.C. 119(a)-(d).

BACKGROUND OF THE INVENTION

The invention relates to a DC voltage network with DC voltage sub-networks and energy stores. The invention further relates to a vehicle with such a DC voltage network. The invention additionally relates to a method for controlling such a DC voltage network.

Today frequency converters are being extended into larger and larger configurations and besides their classical function of regulating just one motor, can also play a network feed-in role (e.g. in the case of wind power plants) or even form an entire DC voltage network, or DC network for short. Under examination here now is a DC voltage network in which electrical devices such as electrical loads and sources exchange electrical energy. The supplying of the DC voltage network with electrical energy takes place with the aid of one or multiple rectifiers from an AC voltage network.

A typical exemplary application for a DC voltage network is the energy supply on board a ship or a vehicle, in particular a rail vehicle. With the aid of the DC system electrical energy is distributed to individual electrical loads. Here, a portion of the existing drives and equipment should still function including in the event of a fault. This is known as redundancy.

The maximum level of redundancy is required for Dynamic Positioning 3 (DP3) in the certification of ships. Today, ships are here divided into three zones, also known as sectors, which then have three independent systems. Here three separate switchboards are necessary, which are then fed from three independent sources.

A DC voltage network is currently equipped with fuses and disconnectors, in order to separate the source of the fault from the network in the event of a fault and be able to maintain the operation of the remaining electrical loads. In the case of a short circuit it can however not be ruled out that electrical components which are connected to the DC voltage network are damaged. This damage can lead to the failure of the corresponding electrical components. In order to prevent this, in some cases high-speed switches are employed, which are intended to reduce the damaging effect of the short circuit.

The object underlying the invention is to improve a DC voltage network.

SUMMARY OF THE INVENTION

The object is achieved by a DC voltage network with at least three DC voltage sub-networks, at least three energy storage networks, at least nine power converters, at least three energy stores, wherein each DC voltage sub-network is connected to each energy storage network via at least one power converter, wherein each energy storage network in each case is connected to at least one of the energy stores in such a way that the energy storage network concerned has the voltage of the respective energy store, wherein each DC voltage sub-network can be connected to at least one AC voltage network via at least one feed device. The object is further achieved by means of a vehicle, in particular a ship, with such a DC voltage network. The problem is further solved by a method for controlling such a DC voltage network, wherein upon the occurrence of a fault in the DC voltage network depending on the location of the fault at least one of the power converters is switched off.

Further advantageous embodiments of the invention are specified in the dependent claims.

The invention is based on the finding that the redundancy of the DC voltage network can be raised to Level DP3, as known from marine certification, and even beyond, if three energy storage networks in each case with at least one energy store are created in the DC voltage network. The reliable execution of the exchange of energy with electrical devices, including both electrical loads and also sources, is thus permitted.

The DC voltage network can here be used in industrial applications, applications for secure energy supply as also in vehicles, in particular in ships, aircraft or land-based vehicles such as automobiles or trucks. The safety-relevant aspects will be examined, based on the example of the ship. The topic of safety is of great significance for numerous applications in the other aforementioned technical areas, even if the individual concrete safety requirements are not addressed below.

Here each DC voltage sub-network is in each case connected to each energy storage network via one, in particular exactly one, of the at least nine power converters. This arrangement represents a matrix form. It has proved to be particularly advantageous if the at least nine power converters are embodied in identical form. The individual energy storage networks are here only connected to each other via the DC voltage sub-networks.

The weakest element in the operation of an energy supply network, for example on board a ship, are the energy generators, the diesel engines, as these have the lowest level of reliability due to their high degree of mechanical complexity. If diesel engines are now replaced as the energy source by battery-backed converters, a significant gain in reliability has already been achieved. As well as the battery other energy stores can also be used. With the 3×3 matrix arrangement, not only are the essentially more reliable converters available as energy sources (or at least as back-up, for generator failure, depending on the operating concept), but in the event of the failure of an energy store it is even possible to continue supplying three DC voltage sub-networks. In other words due to the matrix arrangement the level of redundancy is higher than the redundancy in the case of the already familiar normal three-channel arrangement. This arrangement also makes it possible in the case of DP3 no longer to realize the energy flow in the ship's network with a 3-phase AC bus, but with the DC bus. This also has the advantage that energy conversion stages and cabling effort are reduced.

In the case of failure of the energy supply from a feeder network the exchange of energy with the electrical devices can be maintained with the aid of the energy store. The energy storage network can be a DC voltage network or an AC voltage network. The use of a DC voltage network is particularly suitable for energy stores with a DC voltage. That is to say these stores have a DC voltage at their terminals during operation. Batteries and capacitors (for example double-layer capacitors such as UltraCaps) are typical representatives of this type of energy store.

These at least three DC voltage sub-networks and the at least three energy storage networks are connected to each other with the aid of power controllers. DC/DC voltage transformers, in particular bidirectional DC/DC voltage transformers, also known as DCPs, or rectifiers can be used as power controllers. Rectifiers transfer energy between a DC voltage side and an AC voltage side. Bidirectional rectifiers are of particular interest for use in a DC voltage network, as they enable an energy flow in both directions, that is from the AC voltage side to the DC voltage side and from the DC voltage side to the AC voltage side. These power controllers are arranged between DC voltage sub-networks and the energy storage networks and enable the controlled exchange of energy between these networks. By means of the power controllers it is possible to connect the energy store directly to the energy storage network. Setting of the voltage, in particular for output regulation, then takes place via the power controllers connected to the energy storage network. Batteries and/or UltraCaps can thus be charged or discharged in a DC energy storage network or rotating stores in an AC DC voltage network.

Through the creation of three battery sectors, which have an energy storage network with an energy store and which are connected in each case to a number of power converters, the DC voltage can be realized as desired in all three battery segments. This arrangement is in each case augmented by an additional power converter and a matrix arrangement is thereby created, which makes it possible to feed each of the three DC voltage sub-networks from each battery. The energy flow here functions advantageously in both directions via the power converters in order to charge the batteries. As set out above, this creates not only a back-up for the not-so-reliable diesel engine, which is available in the event of the failure of a diesel engine, but rather a three-channel redundant feeder system, which as a result of the 3×3 matrix arrangement exceeds the requirements of certification authorities. In addition, energy transfer between the DC voltage sub-networks and the individual segments of the DC voltage network is possible.

In all sub-networks the voltage can be controlled or regulated as desired by means of the power controllers. Within the energy storage network the voltage is regulated according to the mode of operation of the energy store connected there. The power controllers thus have multiple functions. Firstly this is the secure separation of the individual sub-networks for example in the case of a fault. In addition to this the power controllers regulate or control the exchange of power between the sub-networks. Furthermore the voltage in the energy storage network is adjusted in such a way that the energy store is charged or discharged as required. This system brings a marked improvement in reliability while only employing fewer components, as for example a battery charging device can be dispensed with.

In the case of a short circuit in a sub-network, the two other sub-networks can continue to be operated, That is to say that the battery backup is retained. In particular in the "marine propulsion" application this is of great importance, and is tested upon acceptance of the vessel. With the use of switches instead of power controllers the failure of a switch has the effect that the system can no longer be securely operated. Upon the failure of a power controller at least one DC voltage sub-network can still continue to supply the connected electrical loads. Thus in the case of a ship, for example, half of the drive power can still be produced.

The DC voltage network is particularly advantageous if it represents an island network. This is for example the case on board ships or in vehicles, in particular in rail vehicles. The strain imposed by large electrical loads, in particular the switching-on and switching-off of large electrical loads can be reduced through the provision of energy from the energy store. Effects on other components, for example caused by a drop in the DC voltage or a short-term overvoltage, can be prevented completely, or at least for the most part, thanks to the highly dynamic power controller.

In the case of shipboard use, maneuverability can be reliably ensured as a result of the high level of redundancy.

In one advantageous embodiment of the invention the power converters in each case have a DC voltage converter and the voltage of the energy store is a DC voltage. DC voltage converters are frequently also known as DC/DC converters. Advantageously, this should permit a bidirectional energy flow. These DC/DC converters are then also described as DCPs. With this arrangement the DC voltages within the DC voltage network can be adjusted in a particularly dynamic manner. It is thus possible to react to a fault so rapidly that no damage to electrical devices occurs. In addition to this, energy stores with DC voltage, such as for example batteries or capacitors, in particular double-layer capacitors such as UltraCaps, can be connected directly to the energy storage network, Additional charging devices, which frequently have relatively slow control behavior for decoupling with the other components in the system, can then be dispensed with.

In addition to this it has proved to be advantageous if the DC voltage converter has electrical isolation. Residual currents can thus be prevented particularly in the event of a ground fault. At the same time in some cases even the entire DC voltage network remains operational upon the occurrence of a ground fault.

In a further advantageous embodiment of the invention the power converters in each case have a rectifier and the voltage of the energy store is an AC voltage, Rectifiers enable energy transmission between a DC and an AC voltage network. The use of bidirectional rectifiers is particularly advantageous, as energy transmission in both directions is possible with these. Energy stores in the energy storage network with AC voltage can thus be charged or discharged in a regulated or controlled manner, Rotating stores such as flywheel mass stores for example come into consideration as energy stores with an AC voltage connection. An actuator, a converter, which would otherwise be customary, can be dispensed with, which saves costs. At the same time a particularly high level of control dynamics can be achieved with the rectifier, in order to be able to react to instances of faults swiftly enough to prevent damage to other components of the DC voltage network. Here too a galvanic isolation of the sub-networks from each other can be achieved in a particularly simple manner for example by means of a transformer. Residual currents can thus be prevented particularly in the event of a ground fault. At the same time in some cases even the entire DC voltage network remains operational upon the occurrence of a ground fault.

In a further advantageous embodiment of the invention the DC voltage network has at least one connection adapter, wherein two of the DC voltage sub-networks are connected to each other by means of the connection adapter. A direct exchange of energy between two DC voltage sub-networks can be achieved by means of the connection adapter. A detour via the energy storage network can be avoided. The energy on its way from the first DC voltage sub-network to the second DC voltage sub-network thus only needs to pass through one converter. In one simple embodiment the connection adapter is a DC voltage converter. An effect on the energy storage network can be prevented by the direct connection of the DC voltage sub-networks. As a result fewer voltage fluctuations are to be observed within the energy storage network. As a consequence of this the lifespan of the energy store connected to the energy storage network is increased. In addition to this the power converters can be smaller in dimensions, as they only need to be designed for the outputs of the energy store. The costs of realization of the DC voltage network can thus be reduced.

In a further advantageous embodiment of the invention the connection adapters are arranged in a star connection, wherein the connection adapters are embodied as rectifiers, wherein a star point of the connection adapters forms an auxiliary AC voltage network. With the aid of the auxiliary AC voltage network not only can an exchange of energy take place between the DC voltage sub-networks, but also the supplying of AC voltage loads can be realized. The auxiliary AC voltage network can here be embodied as a single-phase network, if single-phase rectifiers are employed as connection adapters. It is likewise possible that the auxiliary AC voltage network is embodied as a multiphase network, in particular as a three-phase AC network. This also enables three-phase loads or sources to be connected to the DC voltage network in a simple manner. To this end multiphase, in particular three-phase rectifiers are then used as connection adapters.

The rectifiers on the AC voltage side are here all connected to the auxiliary AC voltage network. This thus forms a sort of star point. On the DC side the rectifiers are connected to different DC voltage sub-networks. An exchange of energy between two DC voltage sub-networks then takes place via two of the connection adapters.

In a further advantageous embodiment of the invention the feed devices are connected to the AC voltage network, wherein the AC voltage network is embodied as a three-phase AC network, wherein the different phases of the three-phase AC network feed electrical energy into different DC voltage sub-networks.

In the case of this energy supply exactly one phase of the AC network is available for each DC voltage sub-network as a result of the three DC voltage sub-networks and the three phases of the AC system. Single-phase rectifiers can thus be employed for the feeder circuit. This makes the feeder circuit cost-effective at the same time as providing a high degree of redundancy via the different phases of the AC network.

BRIEF DESCRIPTION OF THE DRAWING

The invention is described and explained in greater detail below on the basis of the exemplary embodiment represented in the FIGURE, in which:

FIG. 1 shows exemplary embodiments for a DC voltage network

DETAILED DESCRIPTION OF PREFERRED EMBODIMENTS

FIG. 1 shows a DC voltage network 1 with three DC voltage sub-networks 10 and three energy storage networks 13. These form three battery sections 7. The sub-networks are connected to each other with power converters 20 in such a way that an exchange of energy between the DC voltage sub-networks 10 and energy storage networks 13 is directly possible. At the same time the power converters 20 enable the sub-networks to separate from each other in a rapid manner. Electrical devices 3 which represent electrical loads or a source are connected to the DC voltage sub-networks 10. These electrical devices 3 receive electrical energy from an AC voltage network 6, which is connected to the DC voltage sub-networks 10 via feed devices 5. Alternatively or additionally, electrical energy from the energy stores 4, which are connected directly to the energy storage network 13, can be provided or stored. The regulation or control of the energy flow to the energy store 4 takes place with the aid of the power controller 20. It is particularly advantageous if the AC voltage network is embodied as AC network 61.

With the aid of the power controllers 20 the energy flow can be rapidly interrupted, for example in order to isolate faulty components from the entire system. Thus not only can operation of the remaining electrical devices 3 be ensured, but damage to these electrical devices 3, for example caused by overcurrent or overvoltage, can be reliably prevented by a rapid response of the power converters 20.

The energy store 4 represented here takes the form of a battery. Alternatively a capacitor, in particular a double-layer capacitor, can also be used here. Common to these energy stores in operation is that they have a DC voltage. Accordingly DC voltage converters, also known as DC/DC converters, are employed as power controllers 20 in this exemplary embodiment.

Connection adapters 2 are available order to enable an exchange of energy between the individual DC voltage sub-networks 10. In this exemplary embodiment the connection adapters 2 are embodied as rectifiers. These can be single-phase rectifiers, wherein the auxiliary AC voltage network 62 is then a single-phase AC voltage network, or multiphase, in particular three-phase, rectifiers, wherein the auxiliary AC voltage network 62 is then a multiphase, in particular three-phase AC voltage network. On the AC voltage side these rectifiers are connected to each other at a star point 27. Switches 34 are present in order, upon the failure of a rectifier, to be able to separate this from the auxiliary AC voltage network 62.

On the basis of the circuit diagram it is evident that even in the event of the failure of any two components of the DC voltage network, the network still remains operational. Even in the event of failure of still more components, operation can still be guaranteed in many cases. This arrangement thus represents a highly redundant DC voltage network 1.

In summary, the invention relates to a DC voltage network with DC voltage subnetworks and energy stores. For the improvement of the DC voltage network it is proposed that the DC voltage network has at least three DC voltage sub-networks, at least three energy storage networks, at least nine power converters and at least three energy stores, wherein each DC voltage sub-network is connected to each energy storage network via at least one power converter, wherein each energy storage network is in each case connected to at least one of the energy stores in such a way that the energy storage network concerned has the voltage of the respective energy store, wherein each DC voltage sub-network can be connected to at least one AC voltage network via at least one feed device. The invention further relates to a vehicle, in particular a ship with a such a DC voltage network. The invention further relates to a method for controlling such a DC voltage network,

What is claimed is:

1. A DC voltage network, comprising:
   at least three energy storage networks, each energy storage network comprising an energy store supplying a DC voltage to the energy storage network, and each energy storage network further comprising at least three power converters implemented as DC voltage converters, the energy store and a first voltage side of each of the at least three power converters being electrically connected at a common point;

at least three DC voltage sub-networks, each DC voltage sub-network being connected to a second voltage side of a respective power converter of each of the at least three energy storage networks; and at least three feed devices, each feed device connecting a respective one of the at least three DC voltage sub-networks to at least one AC voltage network.

2. The DC voltage network of claim 1, wherein the second voltage side of the power converters in an energy storage network is connected to a different of the DC voltage sub-networks.

3. The DC voltage network of claim 1, wherein the power converters are arranged in form of a 3×3 matrix.

4. The DC voltage network of claim 1, further comprising at least one connection adapter interconnecting two of the at least three DC voltage sub-networks with one another.

5. The DC voltage network of claim 4, comprising at least three connection adapters, wherein each of the at least three connection adapters is connected to a different DC voltage sub-network and the at least three connection adapters are interconnected at a star point of a star connection, with the star point forming an auxiliary AC voltage network.

6. The DC voltage network of claim 5, wherein the connection adapters are embodied as rectifiers.

7. The DC voltage network of claim 1, wherein the AC voltage network is embodied as a three-phase AC network, with different phases of the three-phase AC network feeding electrical energy to different DC voltage subnetworks.

8. A vehicle comprising a DC voltage network, said DC voltage network comprising:

at least three energy storage networks, each energy storage network comprising an energy store supplying a DC voltage to the energy storage network, and each energy storage network further comprising at least three power converters implemented as DC voltage converters, the energy store and a first voltage side of each of the at least three power converters being electrically connected at a common point, at least three DC voltage sub-networks, each DC voltage sub-network being connected to a second voltage side of a respective power converter of each of the at least three energy storage networks, and at least three feed devices, each feed device connecting a respective one of the at least three DC voltage sub-networks to at least one AC voltage network.

9. A method for controlling a DC voltage network including at least three energy storage networks, each energy storage network comprising an energy store supplying a DC voltage to the energy storage network, and each energy storage network further comprising at least three power converters implemented as DC voltage converters, the energy store and a first voltage side of each of the at least three power converters being electrically connected at a common point, at least three DC voltage sub-networks, each DC voltage sub-network being connected to a second voltage side of a respective power converter of each of the at least three energy storage networks, and at least three feed devices, each feed device connecting a respective one of the at least three DC voltage sub-networks to at least one AC voltage network, said method comprising:

detecting an occurrence of a fault in the DC voltage network;

determining a location of the fault; and switching at least one of the power converters off, depending on the location of the fault.

* * * * *